United States Patent [19]

DeBiasi et al.

[11] Patent Number: 4,913,123
[45] Date of Patent: Apr. 3, 1990

[54] IGNITION TIMING SYSTEM WITH FEEDBACK CORRECTION

[75] Inventors: Charles J. DeBiasi, Allen Park; Wesley D. Boyer, Dearborn, both of Mich.

[73] Assignee: Ford Motor Company, Dearborn, Mich.

[21] Appl. No.: 327,886

[22] Filed: Mar. 23, 1989

[51] Int. Cl.$^4$ .............................................. F02D 5/15
[52] U.S. Cl. ................................. 123/609; 123/644; 123/426
[58] Field of Search ..................... 123/609, 644, 426

[56] References Cited

U.S. PATENT DOCUMENTS

| | | |
|---|---|---|
| 4,018,202 | 4/1977 | Gartner ............................. 123/609 |
| 4,367,722 | 1/1983 | Mizuno ............................. 123/644 |
| 4,380,989 | 4/1983 | Takaki ............................. 123/644 |
| 4,446,843 | 5/1984 | Rumbaugh et al. ............... 123/609 |
| 4,649,888 | 3/1987 | Kawai et al. ..................... 123/609 |
| 4,711,226 | 12/1987 | Neuhalfen et al. ................ 123/609 |

*Primary Examiner*—Tony M. Argenbright
*Assistant Examiner*—Robert Mates
*Attorney, Agent, or Firm*—Peter Abolins; Clifford L. Sadler

[57] ABSTRACT

Control of spark timing of an ignition system for an internal combustion engine uses a feedback correction signal which is a function of back EMF generated in the primary winding of an ignition coil in response to current change in the secondary winding of the ignition coil due to spark breakdown.

12 Claims, 7 Drawing Sheets

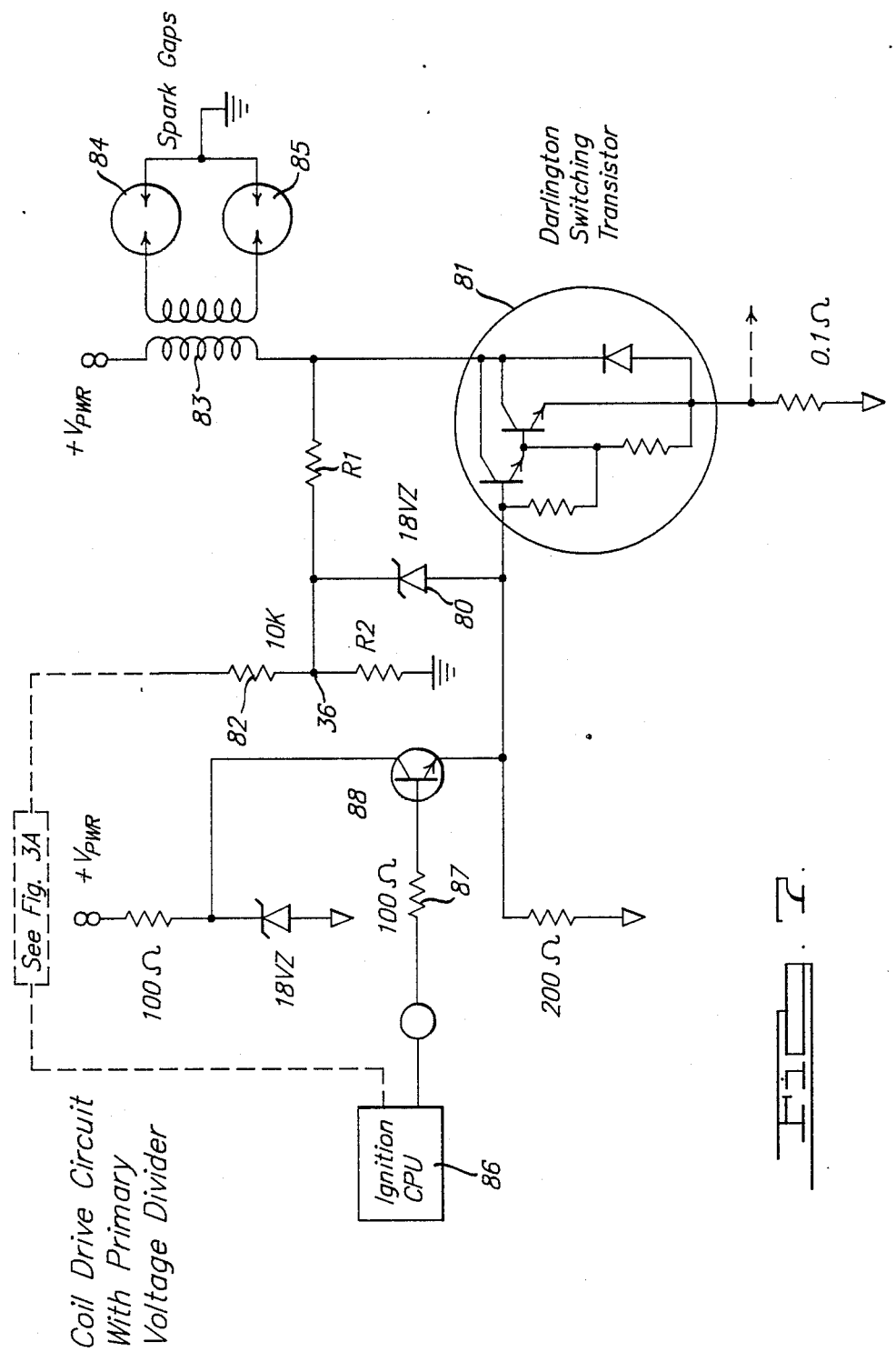

IGNITION TIMING SYSTEM WITH FEEDBACK CORRECTION

BACKGROUND OF THE INVENTION

1. Field of the Invention

This invention relates to controlling ignition timing for an internal combustion engine.

2. Prior Art

Various means are known for controlling the ignition spark timing in an internal combustion engine. For example, spark can be determined by mechanical apparatus as a function of engine speed. Also known are various electronic calculation means wherein a computer processes various inputs defining engine operating parameters to produce a desired timing for operation of the ignition system.

U.S. Pat. No. 4,018,202 issued to Gartner teaches an adaptive engine dwell. U.S. Pat. No. 4,367,722 issued to Tiaki Mizuno has similar teachings. U.S. Pat. No. 4,380,989 issued to Twao Takaki adapts a primary current level in response to secondary energy calculation integrating secondary voltage and current. U.S. Pat. No. 4,446,843 to Rumbaugh teaches an adaptive dwell with a constant percent of excess dwell. U.S. Pat. No. 4,649,888 issued to Matoshi Kawai teaches an adaptive dwell ignition system. U.S. Pat. No. 4,711,226 to Neuhalfen teaches dwell energy control. However, none of the aforementioned patents teach adaptive ignition switching delay compensation for more accurate spark timing using feedback of secondary winding voltage, as reflected back to the primary winding, for improved spark timing.

It would be desirable to have an adaptive ignition switching delay compensation for more accurate spark timing. In particular, it would be desirable to take advantage of feedback of secondary voltage reflected to the primary for improved spark timing. These are some of the problems this invention overcomes.

SUMMARY OF THE INVENTION

This invention teaches using inductive back EMF of the ignition coil (i.e. the EMF induced in the primary winding as a result of spark breakdown in the secondary circuit) as feedback to adjust spark timing as a function of system delays, and using a time measurement for open secondary detection. The ignition system has an improved ignition spark accuracy. Spark misfire and open secondary conditions are detected.

A closed-loop ignition spark controller improves the accuracy of spark placement by compensating for system variables, thereby closing the gap between the desired spark plug firing time and the actual spark plug firing time. The ignition spark controller minimizes the spark variability due to the effects of electrical line impedance, coil inductance, cylinder pressure, coil drive circuitry, temperature drift, process variability, component variability, spark gap variation, signal propagation delays, plug polarity, fuel mixture, road conditions, and other hardware variables. This closed loop spark controller also provides a reliable method of open secondary detection/misfire.

One ignition controller is suitable for a wide range of ignition system configurations with the ability to adapt to vehicle stack up tolerances, design changes, vehicle wear, vehicle operating environment, process parameters, and manufacturing variances. In addition, the design can be used with high data rate crankshaft position sensing, noncalibratable spark controllers, distributorless ignition systems, peak cylinder pressure detection systems, etc. Thus, high volume manufacture of the ignition controller is possible with resulting improvement in reliability and cost.

BRIEF DESCRIPTION OF THE DRAWINGS

FIGS. 6A and 6B are analogous to FIG. 2 and depict actual primary coil voltage versus time for a normal spark event and for a non-firing spark plug, respectively, and the corresponding voltage versus time from a comparator; and FIG. 7 is a schematic of typical coil drive circuitry with the addition of a primary voltage comparator input resistor in accordance with an embodiment of this invention.

DETAILED DESCRIPTION OF THE INVENTION

Figure 1:
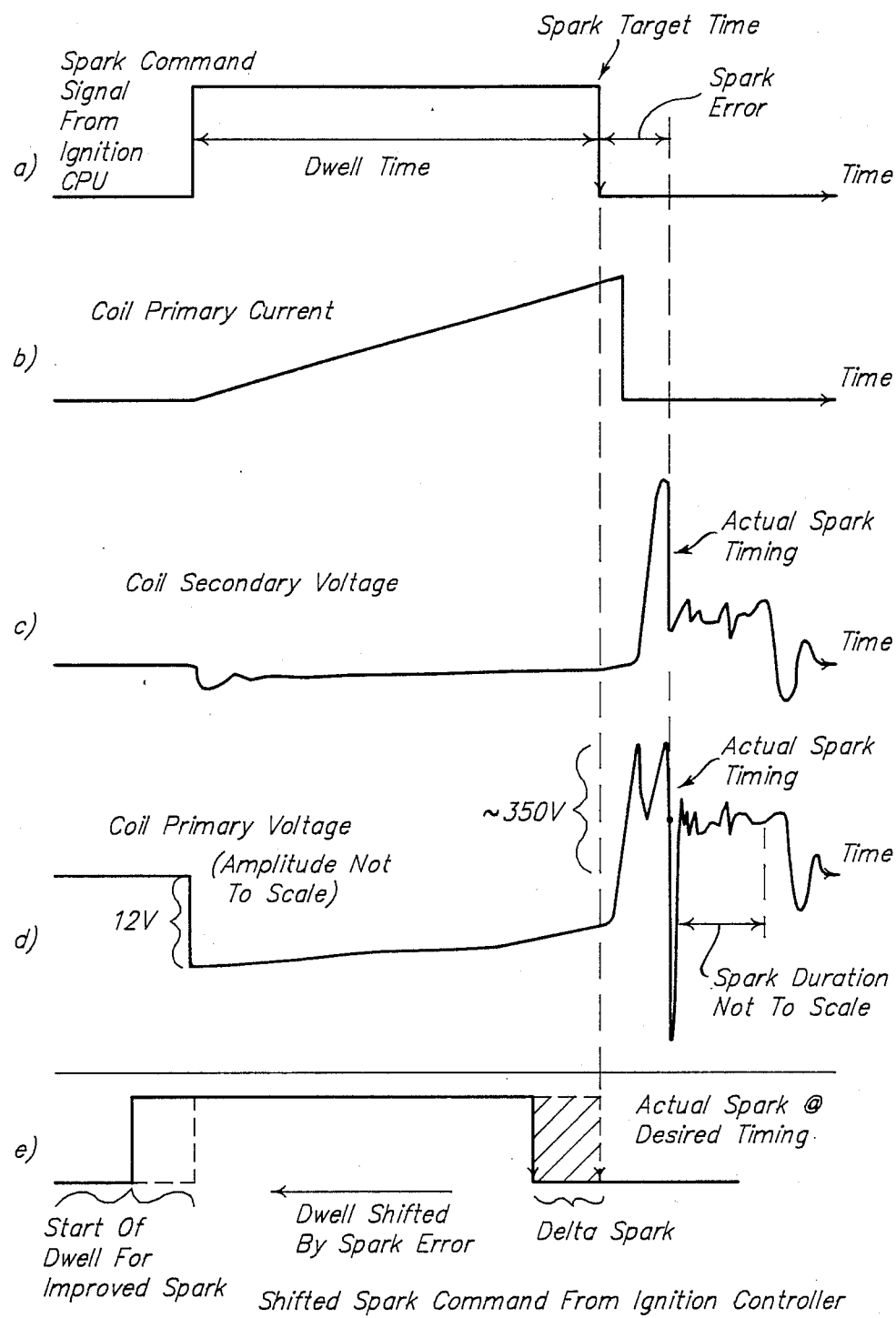
FIGS.1 (a–e) are a graphical representation of signals versus time for an ignition system in accordance with an embodiment of this invention, waveform A representing the spark command signal (showing dwell time and spark target time), waveform B representing the primary coil current, waveform C representing secondary coil voltage, waveform D representing back EMF on the primary side of the coil, waveform E representing a shifted spark command signal in accordance with an embodiment of this invention.

The sequence of FIG. 1 illustrates the delay from the spark plug firing command until actual spark plug firing in an ignition system with an ignition coil having a primary coil coupled to a secondary coil. FIG. 1a shows a spark plug firing command signal (DWELL) from an ignition CPU (such as CPU 86 of FIG. 7). The falling edge of DWELL is the intended spark timing. FIG. 1b shows the primary coil current and subsequent propagation delay. Following the termination of primary coil current, the secondary coil voltage rises until it reaches a critical breakdown voltage (waveform c). The falling edge of the secondary coil voltage depicts the breakdown across the spark gap. It is this event that indicates the actual spark timing. The effect of the rapid high voltage rise and fall of the secondary coil voltage can be sensed as a back Electro Motive Force (EMF) on the primary side of the ignition coil (waveform d).

An ignition spark timing adjustment, denoted as delta spark, may be calculated from the difference between the falling edge of the spark command or DWELL signal at the end of dwell, waveform A, and the high voltage falling edge of the back EMF of the primary coil voltage. Applying the delta spark to the spark command signal, i.e. shifting the falling edge of the DWELL signal backward in time by the offset delta spark, will result in placing the critical breakdown voltage of the spark gap at a time more closely associated to the spark target (waveform e). In order to maintain sufficient ignition energy the leading edge of DWELL is also shifted.

Figure 2:
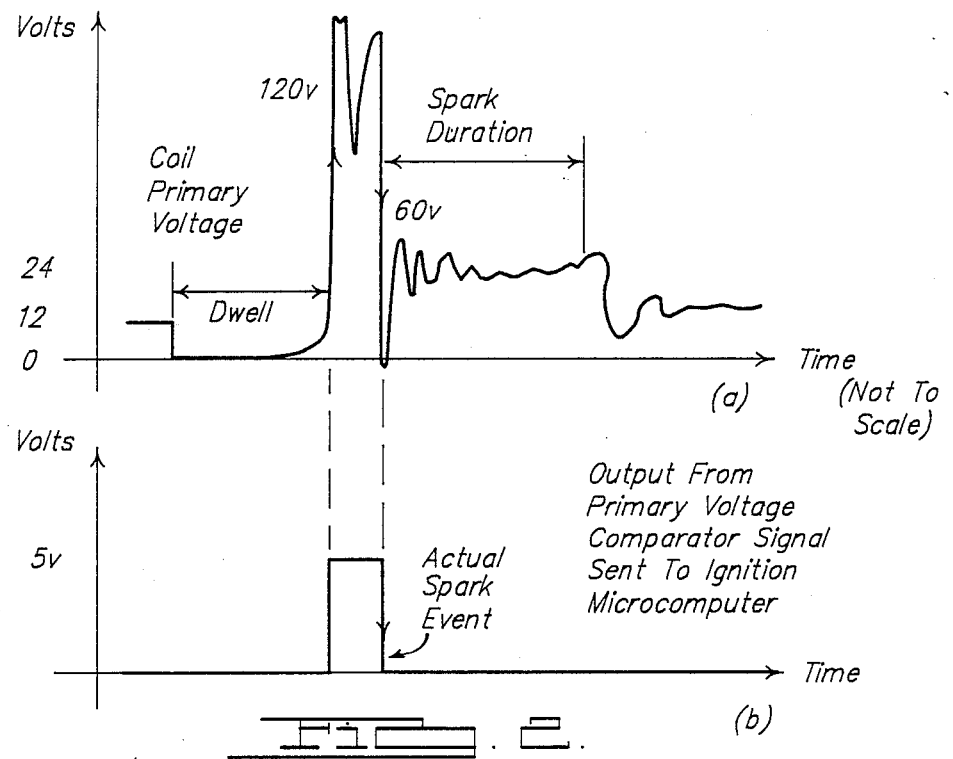
FIGS. 2(a–b) are a representation of the back EMF on the primary coil (waveform A) and of a voltage output from a comparator (waveform B), both with respect to time.
Figure 3:
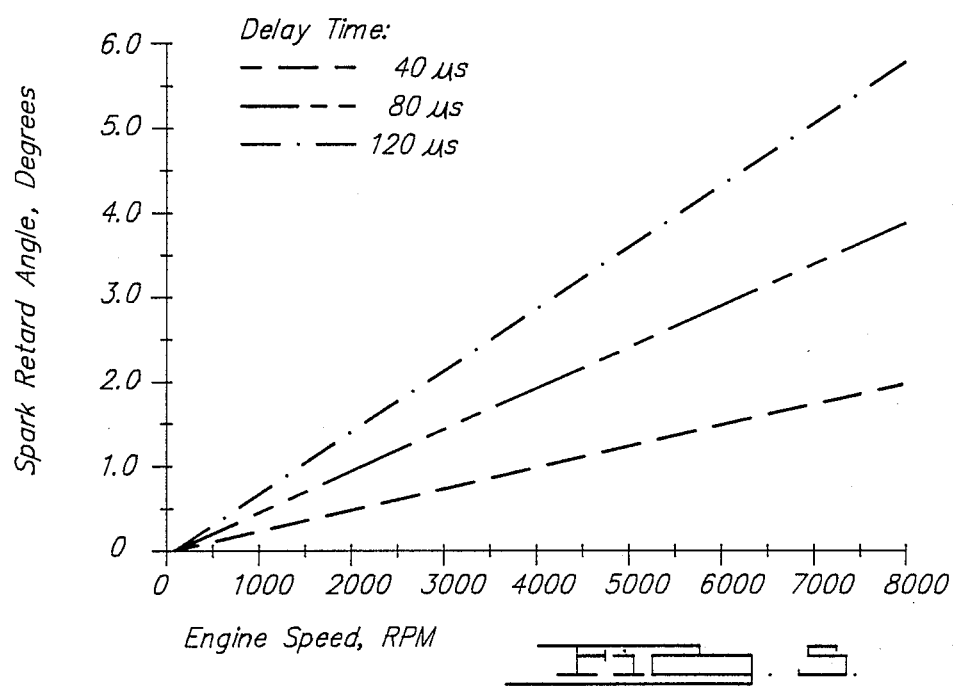
FIG. 3A is a schematic diagram of the ignition coil primary voltage signal conditioning circuitry in accordance with an embodiment of this invention.
FIG. 3B is a graphical representation of the transfer function of logic output versus coil primary voltage for the comparator of FIG. 3A.

FIG. 2 illustrates the desired signal conditioning of the primary coil voltage, or feedback EMF signal. The feedback voltage of the primary (waveform a) will spike up as high as 350 volts and may ring to a negative voltage. Due to the internal parasitics of the ignition coil (e.g. the leakage inductance and stray capacitance), the primary coil voltage will exhibit some high voltage turbulence. In addition, after the initial breakdown voltage is achieved the primary coil voltage may ring negative but will then rise to a level higher than the battery voltage for the duration of the spark. In order to achieve the output signal waveform b of FIG. 2, a hysteretic comparator circuit is used. The comparator, explained in connection with FIG. 3, is coupled to receive the coil primary voltage and to provide a signal indicating actual spark timing to the ignition controller.

Figure 3A:
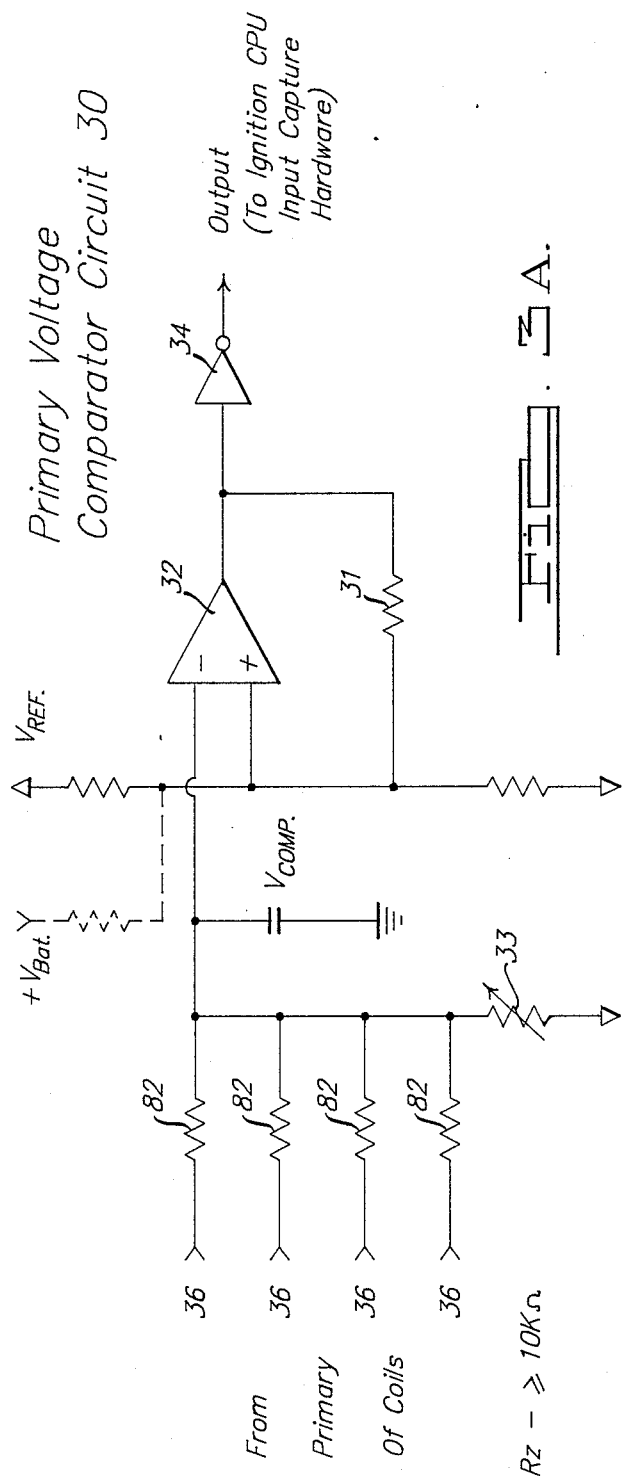

FIG. 3A depicts a schematic diagram of a primary voltage signal conditioning circuit 30. This design allows for one or more primary ignition coils to be wire OR-ed together at inputs 36 in order to use a common comparator 32. Variable resistor 33 is adjusted so a rising voltage of the coil primary causes the output to go to a high state at about one-third of the expected peak (equivalent to about one-third of 350 volts or about 120 volts). Resistor 31 is adjusted for 50 hysteresis; i.e. the output will go low when falling coil primary voltage goes below approximately one-sixth of the peak voltage (60 volts). The output of comparator 32 is coupled to an inverter 34 which has an output signal coupled to input time-capture hardware of an ignition control computer.

Figure 3B:
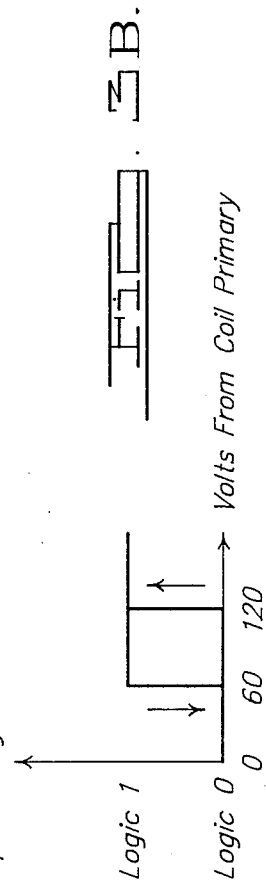

FIG. 3B illustrates the transfer function of comparator 32 of FIG. 3A. The hysteresis of the transfer function causes logic switching at one coil primary voltage (e.g. 120V) when voltage is increasing and at another (e.g. 60V) when voltage is decreasing.

Advantageously, the input capture hardware includes programmable clock circuitry which enables the ignition control computer processing unit (CPU) to access the time of the spark event (trailing edge of the output signal shown in FIG. 2b) with an accuracy which can be four micro-seconds or better. Once the spark timing is captured by the ignition CPU, it is then processed so as to produce the spark command signal of FIG. 1e.

Figure 4:
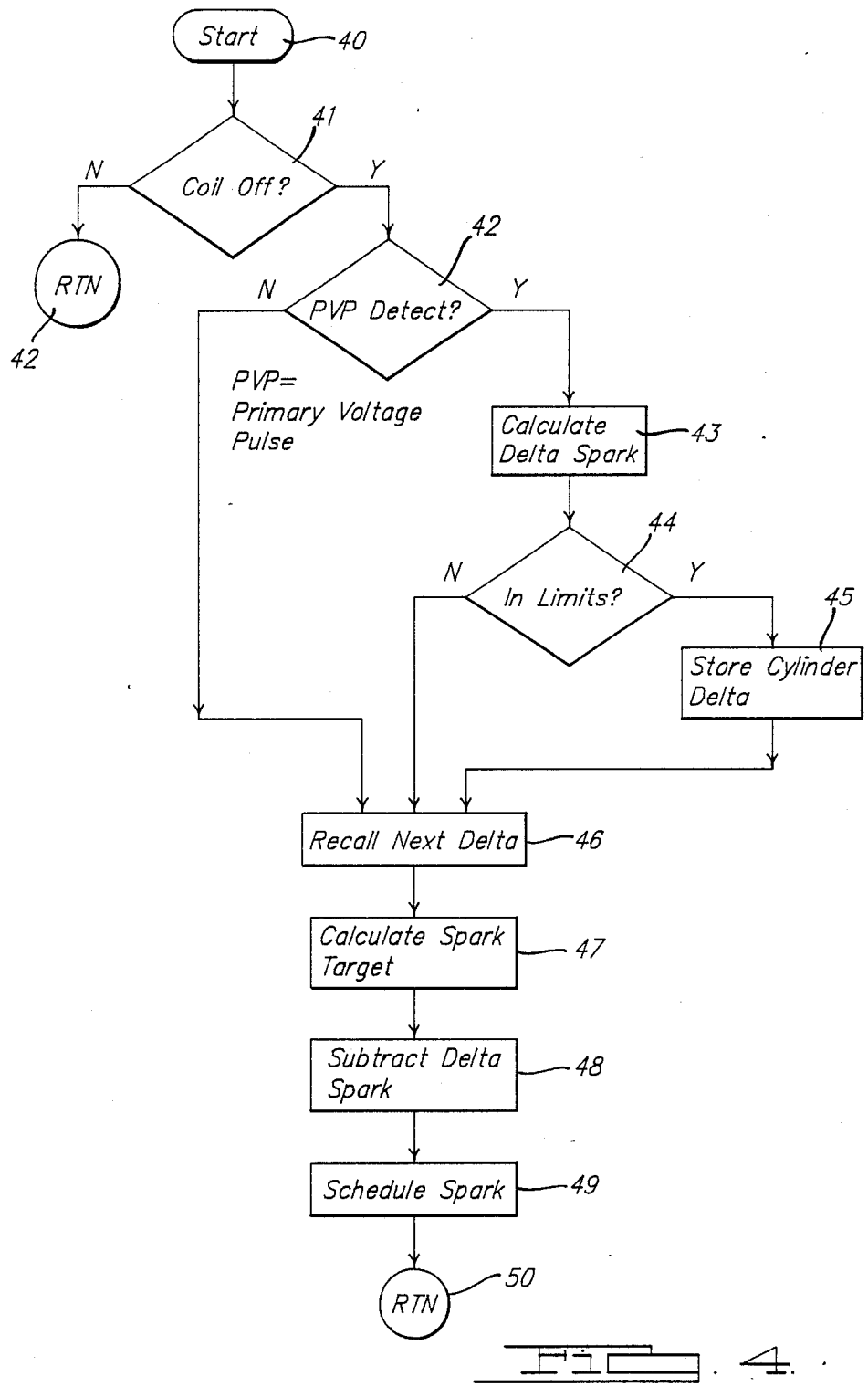
FIG. 4 is a logic flow diagram for controlling ignition current in accordance with an embodiment of this invention.

FIG. 4 is a flow chart of a primary voltage pulse (PVP) software logic flow performed by the ignition CPU. This logic looks for the occurrence of the spark feedback signal. If the signal is detected, a delta spark (i.e. the time between desired and actual spark firing) is calculated and stored in accordance with an associated cylinder identification. Captured values of delta spark are applied to the next spark firing of the associated cylinder.

Referring to FIG. 4, logic flow starts at a block 40 and goes to a decision block 41 where it is determined if the ignition coil is off. If the ignition coil is not off, logic flow goes to a return block 42 to return to the beginning of the logic flow. If the ignition coil is off, logic flow goes to a decision block 42 wherein primary voltage pulse (PVP) is detected. If primary voltage pulse is detected logic flow goes to a block 43 wherein delta spark is calculated. Logic flow then goes to a decision block 44 wherein it is inquired whether the delta spark is within limits. If delta spark is within limits, logic flow goes to a block 45 wherein the delta spark is stored for the particular cylinder. Logic flow then goes to a block 46 wherein the next delta spark for the next cylinder is recalled. Block 46 is directly accessed if in decision block 42 primary voltage pulse is not detected and if in decision block 44 the delta spark was not within the limits. Logic flow from block 46 goes to a block 47 wherein the spark target is calculated. Logic flow then goes to a block 48 wherein the delta spark is subtracted from the calculated spark target. Logic flow then goes to a block 49 wherein the spark is scheduled. From block 49 logic flow goes to a block 50 wherein the logic flow is returned to starting block 40.

Of particular significance to a distributorless ignition system is the ability of the spark controller to store and recall spark deltas for even and odd cylinder pair firings, e.g. a spark delta measured for a positive polarity firing on one cylinder under compression is used for spark compensation on the same plug under identical conditions. This feature eliminates spark errors due to plug polarity and variances in cylinder pressures. Under normal conditions, updated spark deltas are measured for every spark firing. In the event a spark event is not captured the old delay value is retained. Referring to FIG. 1e, the spark delta is used to shift the appropriate DWELL time.

Figure 5A:
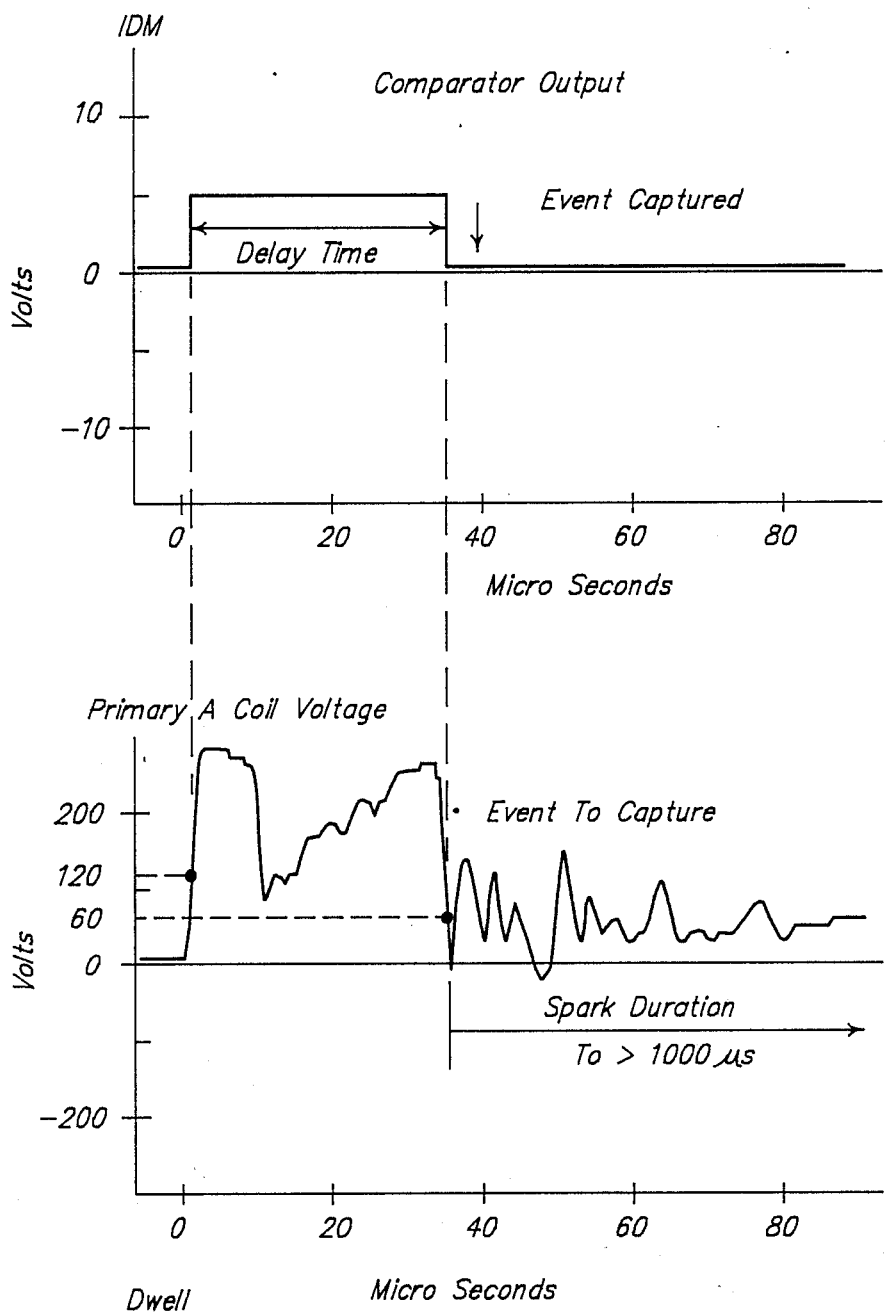
FIG. 5 is a graphical representation of spark angle error versus engine speed.

FIG. 5 is a graph of spark retard angle error versus engine speed. The three curves indicate spark retard error due to a spark timing error of 40, 80, and 120 micro-seconds. Spark angle errors above one degree will affect engine drive performance. Spark angle errors below one degree are also of significance since they are additive to other system offsets. These are the spark retard angle errors which can be reduced using this invention.

The delta spark PVP comparator (FIG. 3A) and software logic (FIG. 4) are used to detect an open secondary. An open circuit secondary winding or misfire condition is indicated when the delta spark value (i.e. the time for shifting the spark) exceeds the maximum allowable time for a normal spark (e.g. about 100 micro-seconds) but is within an established upper limit (e.g. about 300 micro-seconds).

Figure 6B:
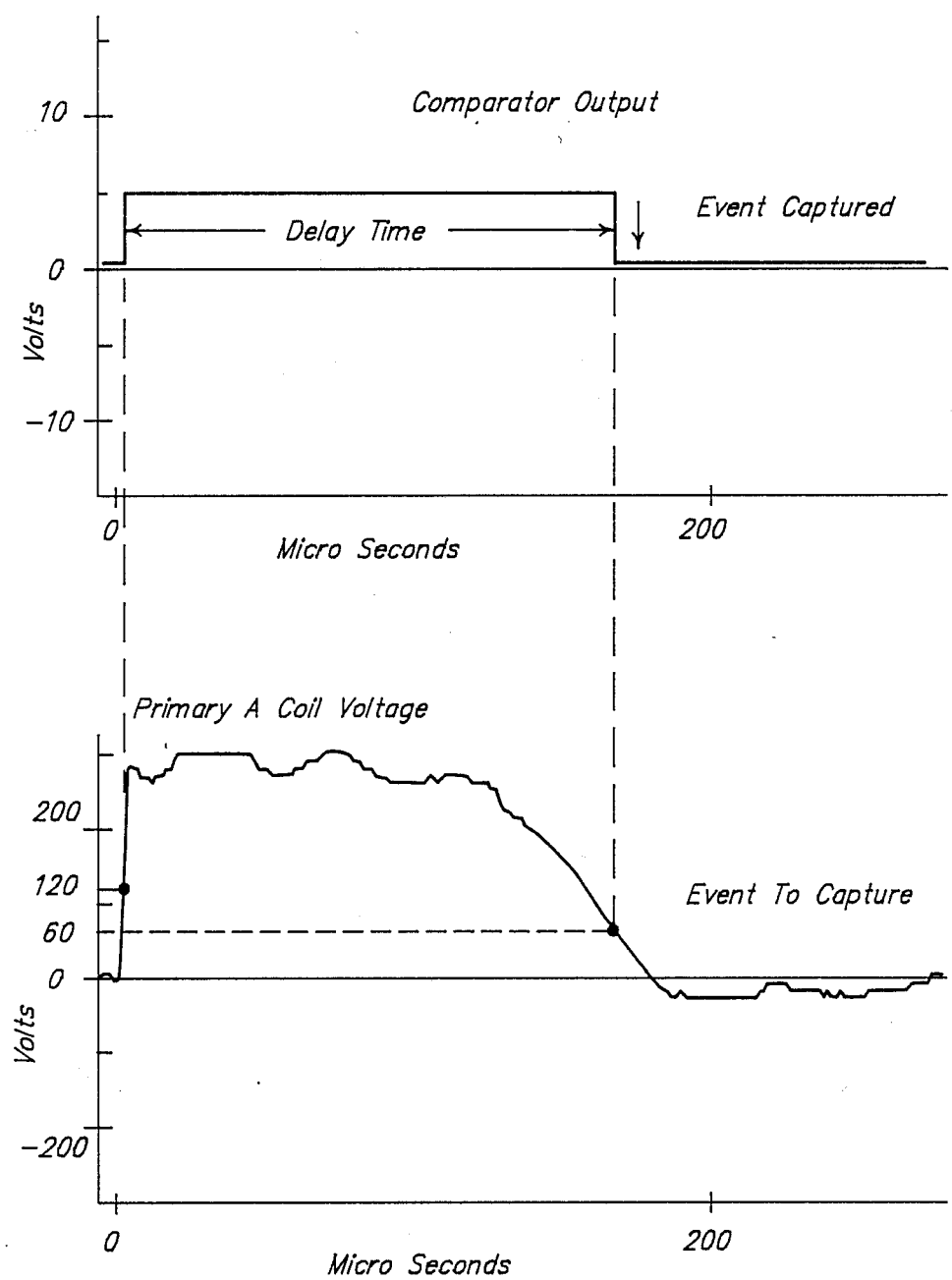

In order to clarify the physical properties governing this detection system it is necessary to analyze the wave patterns of a normal spark (FIG. 6A) versus that of an open secondary (FIG. 6B). In FIG. 6A, the falling edge of the primary coil voltage signal corresponds to the end of the spark delay time captured by the CPU (normally between 30 and 50 micro-seconds). FIG. 6B depicts a primary coil voltage indicating an open secondary winding condition (spark delay equal to about 170 micro-seconds). In FIG. 6A, the majority of the coil energy is dissipated during the spark duration (the 1 to 2 millisecond period following the high voltage breakdown when the value of the primary winding voltage is several volts greater then the battery voltage). Under an open secondary winding condition (FIG. 6B) the majority of the coil energy is dissipated during the high voltage swing of the primary coil due to the protective/clamping circuitry on the switching transistor. Since there is no completed secondary circuit the high voltage condition is reflected back to the primary and remains until it can no longer be sustained. This collapse of the high voltage occurs at a later time than the breakdown of a normal spark.

The critical parameter governing this detection system is the duration at maximum amplitude of the primary voltage. FIG. 7 illustrates an ignition coil drive circuit. The clamp circuitry R1, R2, and the 18 volt zener diode 80 are used to protect a Darlington switching transistor stack 81 from the destructive Vcb voltages. This circuit is tuned via the R2/(R1+R2) ratio to as high a voltage as allowed in order to permit high secondary breakdown voltage and still adequately protect Darlington stack 81, for example 350 volts. The high clamp voltages, however, make for shorter spark delays on the open secondary so there is more energy dissipation in a shorter period of time. This requirement narrows the gap between discriminating a normal spark and an open secondary. With closely coupled high energy coils and secondary breakdown voltages below 40 KV this parameter is less critical and allows enough guard banding under all operating voltages and conditions to minimize false detection. Ignition coil 83 is coupled in series with Darlington stack 81 and governs sparking in spark gaps 84 and 85. The primary voltage comparator of FIG. 3A is coupled to the junction of resistor R1 and R2 through a resistor 82. Ignition CPU 86 is coupled through a resistor 87 and a transistor 88 to Darlington stack 81.

Various modifications and variations will no doubt occur to those skilled in the art to which this invention pertains. For example, the particular circuit components may be varied from those disclosed herein. These and all other such variations which basically rely on the teachings through which this disclosure has advanced the art are properly considered within the scope of this invention.

We claim:

1. A method of controlling spark timing of an ignition coil, with a primary and secondary winding, in an ignition system for an internal combustion engine including the steps of:
   generating a dwell signal to control current flow in the primary winding of the ignition coil and to schedule spark timing;
   applying electrical energy to the ignition coil of the ignition system;
   detecting the back EMF generated by the primary winding of the ignition coil in response to current change in the secondary winding of the ignition coil;
   using the detected back EMF as a feedback input to the ignition system; and
   offsetting the scheduled spark timing as a function of the detected back EMF to compensate for system delays.

2. A method of controlling spark timing as recited in claim 1 wherein the steps of using the detected back EMF as feedback and offsetting the spark timing include:
   detecting a falling (terminating) edge of a dwell command signal controlling primary winding current flow;
   detecting a high voltage falling edge of the primary winding back EMF;
   comparing the falling (terminating) edge of the dwell command to the high voltage falling edge of the primary winding back EMF and determining a difference between the two;
   calculating a delta spark signal as a function of the difference; and
   applying the delta spark signal to the dwell signal so as to shift the dwell signal in time as a function of the delta spark signal thereby adjusting the time of actual spark to be more closely positioned to the time of desired spark.

3. A method of controlling spark timing as recited in claim 2 further comprising the steps of:
   detecting the time of the collapse of high voltage generation in the secondary windings of the ignition coil; and
   determining the existence of an open circuit condition in the secondary winding if the detected time is greater than a predetermined amount.

4. A method of controlling spark timing as recited in claim 2 wherein the step of applying the delta spark to the dwell signal so as to shift the dwell signal in time includes shifting the rising and falling edges of the dwell signal in time by the same amount.

5. A method of controlling spark timing of an ignition coil, with a primary and a secondary winding, in an ignition system for an internal combustion engine including the steps of:
   generating a dwell signal to control current flow in the primary winding of the ignition coil and to schedule spark timing;
   applying electrical energy to the ignition coil of the ignition system;
   adjusting the dwell signal to stop current flow in the primary winding of the ignition coil;
   detecting the back EMF generated by the primary winding of the ignition coil in response to current change in the secondary winding of the ignition coil;
   detecting the falling (terminating) edge of the dwell signal controlling primary winding current flow;
   processing the back EMF signal to generate a comparator signal with a falling edge indicating the time of actual spark occurrence;
   comparing the falling (terminating) edge of the dwell signal to the comparator signal falling edge;
   calculating a delta spark signal as a function of the comparison;
   applying the delta spark signal to the dwell signal so as to shift the dwell signal in time as a function of the delta spark signal thereby adjusting the time of actual spark to be more closely positioned to the time of desired spark; and
   determining the existence of an open secondary winding if the delta spark signal is larger than a predetermined amount.

6. A method of controlling spark timing as recited in claim 5 further comprising the steps of:
   associating each delta spark signal with a particular cylinder of the ignition system;
   storing each delta spark signal in a memory; and
   retrieving the delta spark signal from the memory for use in adjusting the dwell signal.

7. A method of controlling spark timing of an ignition coil as recited in claim 5 wherein the steps of processing the back EMF signal and comparing the signals include the steps of:
   coupling a signal from the primary coil to a comparator;
   operating the comparator in a hysteretic manner;

generating a falling output from the comparator corresponding to the falling back EMF indicating actual spark firing.

8. A method controlling spark timing as recited in claim 7 further comprising the steps of:
controlling the operation of a distributorless ignition system by coupling in parallel the signals from a plurality of primary coils to the comparator and associating each delta spark signal with two cylinders.

9. A method of computing a correction for ignition spark timing for an internal combustion engine, having an ignition coil with a primary and a secondary winding, including the steps of:
generating a dwell signal to control current flow in the primary winding of the ignition coil and to schedule spark timing;
determining whether the primary coil is in a nonconducting state;
detecting the secondary voltage as reflected in the primary circuit;
calculating a spark correction factor if a primary back EMF pulse is detected;
determining whether the spark correction factor is within desired limits;
storing a cylinder spark correction if the spark correction is within predetermined limits;
recalling a previously stored spark correction if the calculated spark correction is outside the predetermined limits; and
adjusting the dwell signal as a function of the spark correction.

10. An ignition system for an internal combustion engine includes:
an ignition coil with a primary and a secondary winding;
generating means for generating a dwell signal to control current flow in the primary winding of the ignition coil and to schedule spark timing; and
sensing means coupled to said primary winding for sensing a back EMF generated by said primary winding in response to current change in the secondary winding of the ignition coil.

11. An ignition system for an internal combustion engine as recited in claim 10 wherein said sensing means includes:
a hysteretic comparator having a first input coupled to a first reference voltage when the output is low and coupled to a second reference voltage when the output is high, and a second input coupled to detect the primary coil voltage across said primary winding.

12. An ignition system as recited in claim 11 further comprising a feedback path between the output of said comparator and coupled said first input when the output is low and coupled to a second reference voltage when the output is high.

* * * * *